L. GIRBARDT,

Assignor to A. SCHWARZ & BROTHER.

Caps.

No. 8,602. Reissued Feb. 25, 1879.

Witnesses.

Otto Stupeland

William C. Miller

Inventor.

Leonhard Girbardt.

by

Van Santvoord & Hauff his attorneys.

UNITED STATES PATENT OFFICE.

LEONHARD GIRBARDT, OF NEW YORK, N. Y., ASSIGNOR TO ADOLPH SCHWARZ & BROTHER.

IMPROVEMENT IN CAPS.

Specification forming part of Letters Patent No. 192,253, dated June 19, 1877; Reissue No. 8,602, dated February 25, 1879; application filed January 30, 1879.

*To all whom it may concern:*

Be it known that I, LEONHARD GIRBARDT, of the city, county, and State of New York, have invented a new and useful Improvement in Caps, which improvement is fully set forth in the following specification, reference being had to the accompanying drawings, in which—

Figure 1:
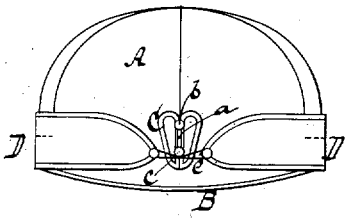
Figure 2:
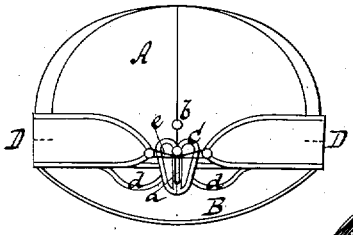
Figure 4:
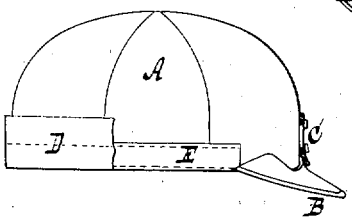
Figure 5:
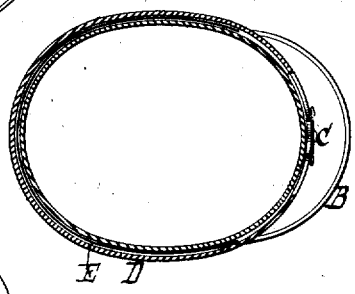
Figure 3:
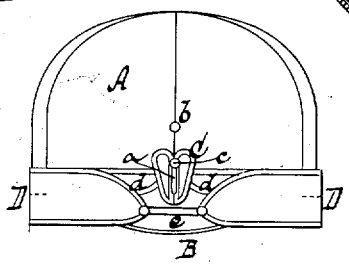
Figure 6:
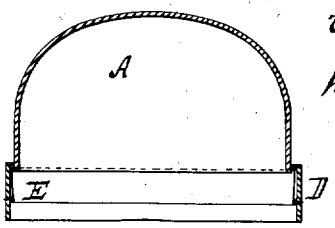

Figures 1, 2, and 3 are front views of my cap, showing the parts in their different positions. Fig. 4 is a side view thereof, partly in section. Fig. 5 is a cross-section of the same. Fig. 6 is a vertical section thereof.

Similar letters indicate corresponding parts.

My invention relates especially to that class of caps comprising a sliding protector for the ears and neck; and it consists in combining, with the crown of a cap and a protector of this character, an apron for supporting the protector, attached to the lower edge of the crown and to the middle of the protector, so that the latter is permitted to slide up and down, and both its upper and lower positions are determined. The ear and neck protector surrounds the crown, and with the latter is combined a front or visor to support the protector at the front of the cap, the apron being terminated at the ends or sides of this visor, so that the protector is loose or detached between the ends of the visor. I hinge the visor to the crown, so that it can be raised or lowered, and combine therewith a slide adapted to engage buttons or other equivalent devices attached to the crown for holding the visor up or down.

In the drawings, the letter A designates the crown of my cap. B is the visor; C, the slide, and D the ear and neck protector. The ear and neck protector D is drawn around the crown A, and its ends are joined at the front of the cap by an elastic strap, *e*, or in any other suitable manner.

The letter E designates an apron, which is sewed or otherwise attached along one of its edges to the lower edge of the crown A, and similarly attached along its other edge to the middle of the protector D, as shown. This apron E is made of muslin or other fabric capable of being folded, and it extends from one end or side of the visor B to the other, so that the protector D is thereby connected to the crown A beyond the ends of the visor, but not between the ends thereof.

At the front of the cap, where the protector D is loose or detached, as stated, the same rests on the visor B, and can be moved to any part of the visor, so that the side portions of the protector—namely, those portions thereof covering the ears—can be very nicely adjusted, while at the same time the front part of the protector can be drawn over or off the visor to cover portions of the face.

The apron E allows of sliding the protector D to its different positions, and supports the same, when pulled down, on the back and sides of the cap, while, by the peculiar attachment of the apron, it permits the protector to be brought to a level with the lower edge of the crown, or nearly so, either when it is moved up or down, but not above or below said edge, and hence both positions of the protector are thereby regulated.

The visor B is fastened to the crown A at its ends or sides by a few stitches or other suitable means, upon which the visor swings as an axis or hinge. The slide C is attached to this hinged visor, and is provided with a slot, *a*, whereby the slide is adapted to catch over two buttons, *b c*, which are secured to the crown A in a line with the slot.

When the slide C is made to catch over the upper button, *b*, as shown in Fig. 1, the visor B is thereby held in its upper or normal position; but when the slide is disengaged from the upper button it can be drawn down until the upper end of the slot catches up against the lower button, *c*. In this position the visor B serves to protect the upper part of the face, and by providing the same with two recesses, *d*, eyeholes are formed, through which the wearer is enabled to see when the visor is down.

What I claim as new, and desire to secure by Letters Patent, is—

1. The combination, with the crown A and the ear and neck protector D, of an apron for supporting the protector, attached to the lower edge of the crown and to the middle of the protector, whereby the latter is permitted to slide up and down, and both its upper and lower positions are regulated, substantially as described.

2. The combination, with the crown A and visor B, and with an ear and neck protector, D, surrounding the crown, of a supporting-apron, which is attached to the lower edge of the crown and to the middle of the band, and which extends around the cap from one end or side of the visor to the other, leaving the protector loose or detached between the ends of the visor, substantially as shown and described.

3. The combination, with the crown A, of the hinged visor B and the slide C, adapted to engage buttons or other equivalent devices attached to the crown for holding the visor up or down, substantially as and for the purpose described.

In testimony that I claim the foregoing I have hereunto set my hand and seal.

LEONHARD GIRBARDT. [L. S.]

Witnesses:

E. F. KASTENHUBER,
JACOB BISSINGER.